United States Patent [19]
Fassbender

[11] Patent Number: 5,433,868
[45] Date of Patent: * Jul. 18, 1995

[54] SEWAGE TREATMENT METHOD

[76] Inventor: Alex G. Fassbender, 4407 Laurel Dr., West Richland, Wash. 99352

[*] Notice: The portion of the term of this patent subsequent to Jun. 22, 2010 has been disclaimed.

[21] Appl. No.: 118,707

[22] Filed: Sep. 9, 1993

[51] Int. Cl.$^6$ .............................................. C02F 1/58
[52] U.S. Cl. .................... 210/761; 210/766; 210/903
[58] Field of Search ................. 210/757–763, 210/743, 766, 903, 908, 909; 423/DIG. 20; 588/220

[56] References Cited

U.S. PATENT DOCUMENTS

| | | | |
|---|---|---|---|
| 4,268,397 | 5/1981 | Horie et al. | 210/759 |
| 4,280,914 | 7/1981 | Knorre et al. | 210/759 |
| 4,294,706 | 10/1981 | Kakihara et al. | 210/762 |
| 4,439,326 | 3/1984 | Heilgeist | 210/757 |
| 4,654,149 | 3/1987 | Harada et al. | 210/763 |
| 4,680,169 | 7/1987 | Morgan | 210/758 |
| 4,990,266 | 2/1991 | Vorlop et al. | 210/757 |
| 5,011,614 | 4/1991 | Gresser et al. | 210/761 |
| 5,082,573 | 1/1992 | Goldstein et al. | 210/757 |
| 5,096,599 | 3/1992 | Granelli | 210/766 |
| 5,118,447 | 6/1992 | Cox et al. | 210/761 |
| 5,221,486 | 6/1993 | Fassbender | 210/757 |

OTHER PUBLICATIONS

Third Edition—Wastewater Engineering Treatment, Disposal, and Reuse; edited by George Tchobanoglous and Franklin L. Burton; published by Metcalf & Eddy, Inc.; 1991, pp. iv, 132, and 894.

A G Fassbender; STORS and NitRem: Sludge-to-Oil Conversion and Nitrogen Removal for Waste Water Treatment Plants; May 14, 1991, pp. 1 through 8+two (2) drawings.

Primary Examiner—Thomas Wyse
Attorney, Agent, or Firm—Paul W. Zimmerman

[57] ABSTRACT

The invention greatly reduces the amount of ammonia in sewage plant effluent. The process of the invention has three main steps. The first step is dewatering without first digesting, thereby producing a first ammonia-containing stream having a low concentration of ammonia, and a second solids-containing stream. The second step is sending the second solids-containing stream through a means for separating the solids from the liquid and producing an aqueous stream containing a high concentration of ammonia. The third step is removal of ammonia from the aqueous stream using a hydrothermal process.

7 Claims, 2 Drawing Sheets

SEWAGE TREATMENT METHOD

FIELD OF THE INVENTION

The present invention relates generally to an apparatus and method for treating municipal sewage. More specifically, the invention relates to reducing the amount of ammonia in the effluent from the dewatering step and from the sewage treatment plant as a whole.

BACKGROUND OF THE INVENTION

From the days of the Roman aqueducts, to putting man in orbit, treatment of sewage has reduced human suffering through reduction of disease, and provided a more pleasant environment in high-density population areas such as cities and spacecraft. Municipal sewage treatment in particular has matured and is well characterized.

Typical municipal sewage treatment facilities as shown in FIG. 1 receive the raw sewage influent 10, primarily treat the raw sewage by one of several primary processes producing a primary sludge 11 and a settled effluent 12, digest the settled effluent in an aeration basin 13 via aerobic digestion, secondarily treat the aerobically digested stream by one of several secondary processes producing a biological sludge 14 and a treated water stream 15, then digest the primary and biological sludges (11 and 14, respectively) to produce a digested sludge 16. The digestion process provides an energy output in the form of methane and converts nitrogen bearing compounds, for example amine groups on amino compounds, to ammonia that is released into an aqueous phase. The digested sludge 16 is an input stream to the dewater facility 17 and contains about 3% by weight of solids. The dewater facility 17 exhausts two effluents, the first 18 having less than 1% solids, and the second 19 containing about 20% by weight of solids. The first low-solids dewater effluent 18 contains about 7½ times the overall mass of the second solid-containing stream 19. Moreover, the first 18 low-solids dewater effluent contains a high concentration of ammonia, about 1000 ppm. The first low-solids dewater ammonia-containing effluent 18 is recycled back to the primary treatment portion of the waste water treatment plant, while the second solids-containing effluent 19 is generally prepared for landfill. The secondary treatment has a solids drain for sending solids to the dewater facility 17, and a main effluent 20 that may either be released to the environment or further processed before release to the environment.

One of the difficulties of the conventional sewage treatment plants is the ammonia in the first dewater effluent stream 18. At high concentrations (up to 1000 ppm ammonia), the second effluent stream 19 is mixed with incoming sewage influent 10, thereby significantly increasing the concentration of aqueous ammonia in the main sewage, settled effluent, and secondarily treated water flows. Aerobic digestion can be impeded because of the toxic effect of high ammonia concentration on the bacteria needed for the digestion. Hence, without further treatment beyond the secondary treatment, ammonia is released to the environment with subsequent algal growth and spoilage of natural waters.

Increased environmental concern precipitating recent legislation relating to disposal of sewage, including the Ocean Dumping Ban Act and the Clean Air Act, mandate that conventional sewage treatment methods will need to be replaced or modified to meet the new standards. Moreover, solutions are being sought to reduce nutrient loading in estuaries and inland waters.

According to U.S. Pat. No. 5,221,486 to Fassbender ('486), ammonia, in the presence of an oxidized nitrogen compound, for example a nitrate, may be removed from an aqueous stream by heating it from about 300° C. to about 600° C., and pressurizing it to maintain an aqueous or supercritical phase, then releasing nitrogen in the form of nitrogen gas and releasing a stream having an amount of ammonia concentration below 50 ppm. Further, in a paper entitled STORS and NitRem: Sludge-to-Oil Conversion and Nitrogen Removal for Waste Water Treatment Plants, presented at AWWA/WPCF Residuals Management Conference, Aug. 11, 1991, by AG Fassbender, it is shown in FIG. 1 of that paper that the second ammonia-containing stream from the dewater facility is sent through the process of '486 for removal of ammonia. It will be immediately recognized by one skilled in the art of sewage treatment that a tremendous amount of thermal energy would be required to heat that stream to a minimum of 300° C. Thus, until the conception of the present invention, there still remained the problem of cost-effectively removing ammonia from sewage plant effluent.

SUMMARY OF THE INVENTION

The invention is a modification of municipal sewage treatment practice that greatly reduces the amount of ammonia in sewage plant effluent. Although directed primarily toward municipal sewage, it will be apparent to those skilled in the art of waste water treatment that other similar waste water treatment stream practices may be modified according to the present invention for ammonia reduction. The process of the invention has three main steps: 1) The first step is dewatering the primary and biological sludges without first digesting, thereby producing a dewatered centrate that is distinct from the first low-solids effluent 18, because the dewatered centrate has not been digested and has a low concentration of ammonia, and a dewatered sludge that is distinct from the digested second high-solids effluent because the dewatered sludge has solids and nitrogen compounds that have not yet converted to ammonia. The dewatered centrate is recycled back to the primary treatment area of the waste water treatment plant where it is combined with the main sewage flow at that point; 2) The second step is sending the dewatered sludge through a means for separating the solids from the liquid and producing an aqueous stream containing a high concentration of ammonia; 3) The third step is removal of ammonia from the aqueous stream using a hydrothermal process.

The process of the present invention has several advantages over existing methods and other prior art. First, the ammonia concentration in the dewatered centrate dewater-facility is much less (30–50 ppm) than the ammonia concentration in predigested first low-solids stream dewater facility effluent (up to 1000 ppm). The dewatered centrate may have an ammonia concentration from about 50 ppm to about 1000 ppm, but it is preferred to avoid predigestion and any heating or processing that would convert nitrogen compounds to ammonia, thereby retaining a preferred ammonia concentration from about 30 ppm to about 50 ppm. Second, less than 1/7th of the total amount of sewage is heated in the '486 process for ammonia removal from the dewatered sludge rather than heating all of the sewage as taught in the paper by Fassbender. Third, all treatment may be accomplished in an aqueous or supercritical phase with attendant advantages in size and cost of equipment. With a reduction in recycle stream ammonia quantity, and concentration of 25-times less than conventional sewage treatment, while processing only the dewatered high-solids stream, the process of the present invention represents a very practical cost-effective sewage ammonia reduction method.

The subject matter of the present invention is particularly pointed out and distinctly claimed in the concluding portion of this specification. However, both the organization and method of operation, together with further advantages and objects thereof, may best be understood by reference to the following description and drawings wherein reference characters refer to like elements in the drawings.

DESCRIPTION OF THE PREFERRED EMBODIMENT(S)

Figure 1:
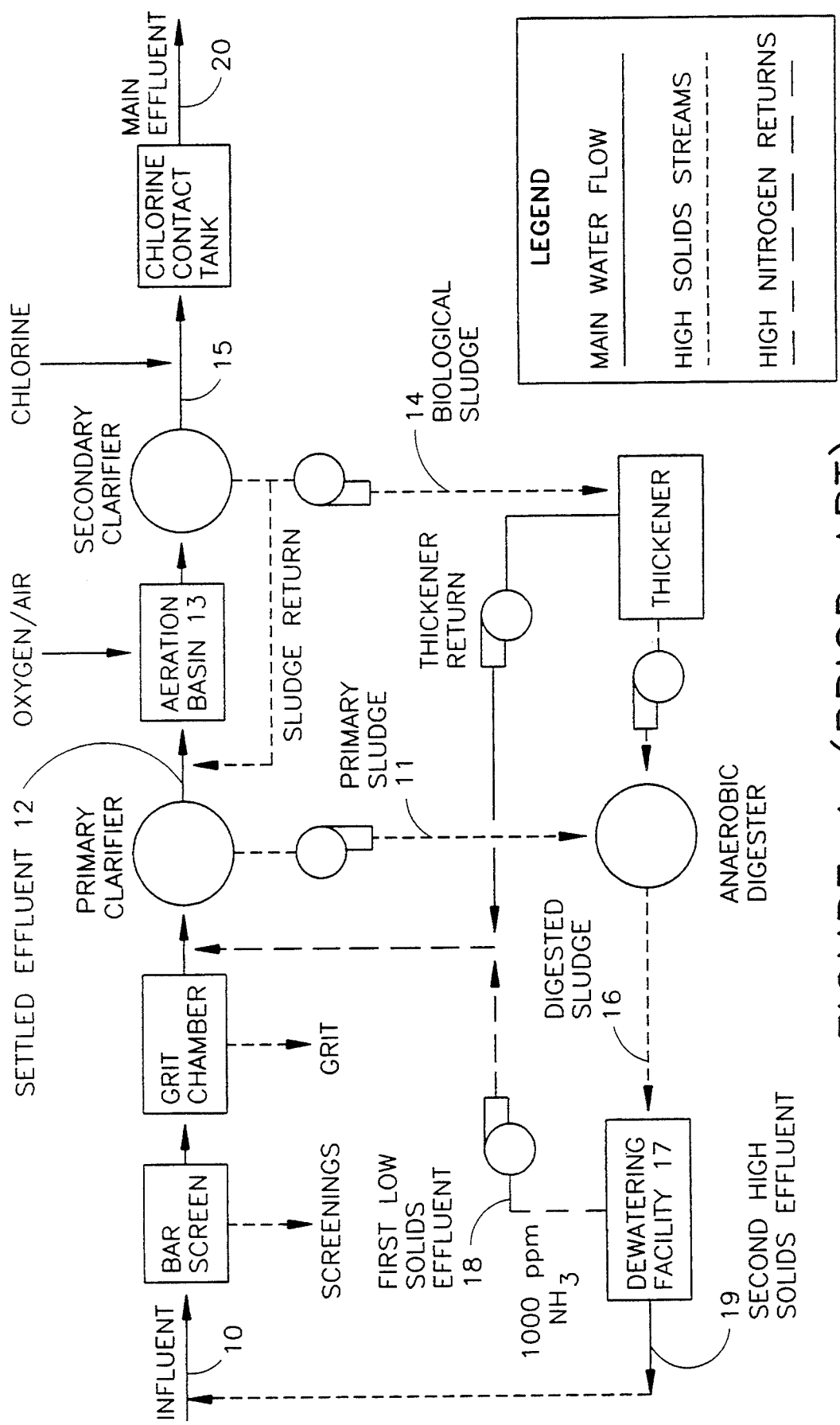
FIG. 1 is a schematic flow diagram of a prior art waste water treatment process.
Figure 2:
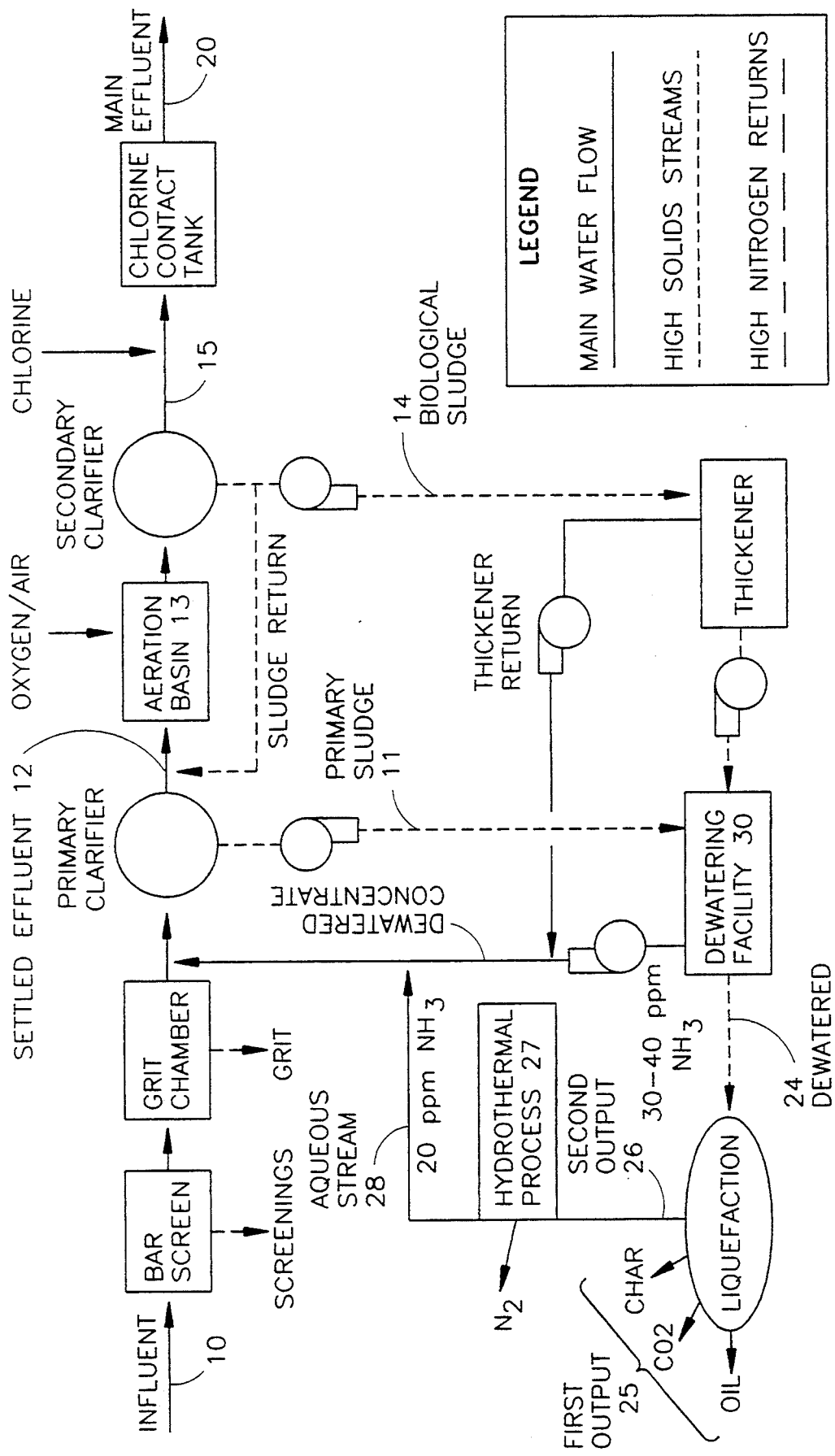
FIG. 2 is a schematic flow diagram of a waste water treatment process modified according to the present invention.

The present invention, illustrated in FIG. 2, is an apparatus and method for treating a municipal sewage stream. The method of the present invention has the steps of:

(a) dewatering raw undigested sludge stream(s) from a waste water treatment plant, and producing a dewatered centrate 22 containing an ammonia concentration less than about 75 ppm, and a dewatered sludge 24 containing the majority of solids including nitrogen compounds;

(b) recycling the dewatered centrate 22 to the primary treatment area of the waste water treatment plant, or processing the dewatered centrate 22 in some other means, including but not limited to ultrafiltration and releasing the first dewatered centrate to the environment;

(c) processing the dewatered sludge 24 and producing a first output 25 having an amount ammonia in a concentration below 250 ppm, preferably below 50 ppm, and a second output 26 having a high concentration of ammonia resulting from the nitrogen compounds;

(d) subjecting the second high-ammonia output to a hydrothermal process 27, thereby releasing nitrogen in the form of nitrogen gas and releasing an aqueous or supercritical stream 28 having an amount of ammonia concentration below 250 ppm, preferably below 50 ppm.

The concentration of ammonia in the undigested dewatered centrate 22 can be as high as 75 ppm or higher, but is preferably less than about 50 ppm and greater than 1 ppm, but most preferably between about 30 ppm to about 50 ppm.

The dewatered sludge 24 may be sent directly to the hydrothermal process. However, omitting the processing step would reduce the advantages of obtaining useful fuel from the solids, and reduce the amount of nitrogen compounds removed from the dewatered sludge 24.

Processing the dewatered sludge 24 can be done by a variety of processes. A preferred processing is a liquefaction, more preferably an alkaline digestion done at elevated temperatures from about 265° C. to about 350° C. under pressure. This alkaline digestion dissolves the sludge and breaks down the solids into a first output of low molecular weight compounds, including but not limited to acetone, acrolein, and glycerol. The low molecular weight compounds may recombine forming primarily aromatic compounds. In addition, the first output includes water and carbon dioxide that are removed yielding a water insoluble product with a higher heating value greater than that of the sludge. The insoluble product is an oil and a char. The second output of the alkaline digestion is an aqueous stream containing nitrogen compounds, primarily ammonia, in concentration ranging from about 500 ppm to about 2000 ppm.

Another preferred processing is wet air oxidation, wherein most or all of the carbon portion of the waste is oxidized in a first stream, and nitrogen compounds are converted into ammonia that is dissolved in a second stream of aqueous phase. Ammonia concentrations in the second output from wet air oxidation range from about 500 ppm to about 3000 ppm.

Yet another preferred processing is supercritical water oxidation that is similar to wet air oxidation except that water is in the supercritical phase.

The hydrothermal process is preferably the '486 process, herein incorporated by reference, wherein the second output is heated to a temperature from about 300° C. to about 600° C. at a pressure to maintain a liquid or super-critical phase, thereby releasing nitrogen in the form of nitrogen gas and releasing an aqueous or supercritical stream 28 having an amount of ammonia concentration below about 250 ppm, and preferably below about 50 ppm.

The apparatus of the present invention is equipment for treating a municipal sewage stream and has;

(a) a dewater facility 30 for dewatering a sludge stream and producing a dewatered centrate 22 containing ammonia in an amount less than about 75 ppm, and a dewatered sludge 24 containing solids together with nitrogen compounds;

(b) means for recycling the dewatered centrate to the primary treatment area of the waste water treatment plant;

(c) means for processing the dewatered sludge and producing a first output having an amount ammonia in a concentration below 50 ppm, and a second output having a high concentration of ammonia resulting from the nitrogen compounds;

(d) means for hydrothermally treating the second high-ammonia output, thereby releasing nitrogen in the form of nitrogen gas and releasing an aqueous or supercritical stream having an amount of ammonia concentration below 50 ppm.

Means for recycling the dewatered centrate back to the primary treatment area of the waste water treatment plant is preferably a pipe or other liquid transfer conduit. The advantage of reduced ammonia in plant effluent is achievable without this means.

Means for processing the dewatered sludge may be any means by which solids are separated or converted into a first output, and an aqueous stream containing ammonia is a second output. Preferred means include but are not limited to means for liquefaction, means for alkaline digestion, means for wet-air-oxidation, and means for supercritical water oxidation.

Hydrothermally treating the second output is preferably a means for heating the second output to a temperature from about 300° C. to about 600° C. at a pressure to maintain a liquid or supercritical phase, thereby releasing nitrogen in the form of nitrogen gas and releasing an aqueous or supercritical stream having an amount of ammonia concentration below 50 ppm.

The means for heating may be any means including electric, fossil fuel, solar, chemical fuel fired heater, whether internal or external, to a vessel containing the second output.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method for treating municipal sewage or similar waste water treatment plant streams, comprising the steps of:
   (a) dewatering an undigested sludge and producing a dewatered centrate having an ammonia concentration less than 1000 ppm, and dewatered sludge containing solids together with at least one compound containing nitrogen;
   (b) processing the dewatered sludge and producing a first output having a low ammonia concentration, and a second output having a high concentration of ammonia resulting from the nitrogen compound(s); and
   (c) subjecting the second output to a hydrothermal process, thereby releasing nitrogen in the form of nitrogen gas and releasing an aqueous or supercritical stream having a low ammonia concentration.

2. The method as recited in claim 1, wherein processing is liquefaction.

3. The method as recited in claim 2, wherein the liquefaction is alkaline digestion.

4. The method as recited in claim 3, wherein the alkaline digestion comprises the steps of:
   (d) heating the second effluent to a temperature from about 265° C. to about 350° C. under pressure; and
   (e) dissolving the sludge and breaking down solids within the sludge into a first output and a second output comprising an aqueous stream containing nitrogen compounds.

5. The method as recited in claim 1, wherein the processing is wet air oxidation.

6. The method as recited in claim 1, wherein the processing is supercritical water oxidation.

7. The method as recited in claim 1, wherein the hydrothermal process comprises the steps of:
   (f) balancing oxidized and reduced forms of nitrogen in the second output;
   (g) heating the balanced second output to a temperature from about 300° C. to about 600° C. at a pressure to maintain a liquid or supercritical phase; and
   (g) releasing nitrogen in the form of nitrogen gas and releasing an aqueous or supercritical stream having a low ammonia concentration.

* * * * *